Patented Oct. 3, 1950

2,524,627

UNITED STATES PATENT OFFICE 2,524,627

SUSPENSION POLYMERIZATION OF VINYL COMPOUNDS

Walter P. Hohenstein, Kew Gardens, N. Y., assignor to Polytechnic Institute of Brooklyn, Brooklyn, N. Y., a corporation of New York No Drawing. Application January 17, 1946, Serial No. 641,877

5 Claims. (Cl. 260—89.1)

1

This invention relates to polymerizing unsaturated organic compounds, and more particularly to a new and improved pearl polymerization method of vinyl compounds.

Vinyl compounds have been polymerized by the dispersion or pearl polymerization method. In certain embodiments of such process, the vinyl compound was polymerized in an aqueous suspension in the presence of a finely divided inorganic substance, such as clay, talc, barium sulfate, etc., which was also suspended or dispersed in the water and acted as a suspension stabilizer. The vinyl compound and the inorganic solid substance were maintained during the polymerization reaction in dispersion in the water by agitation, no emulsifying agent being added, and at the end of the reaction the polymerized product was obtained in the form of discrete particles (hence the name pearl). Relatively large amounts of clay, talc, or barium sulfate, based on the monomer were used. For example, when talc or clay constituted the suspension stabilizer, it was used in an amount of at least 5% by weight based on the monomer, and, in the case of barium sulfate, the quantity thereof was at least 10% by weight of the monomer. During the polymerization reaction, some of the finely divided solid inorganic particles were entrapped in the polymerized product, with the consequence that some of the desirable properties of the product were affected. The inclusion of the inorganic particles in the pearls especially impaired the clarity and decreased the electrical properties of the product.

An object of this invention is to provide a new and improved pearl polymerization method of vinyl compounds.

Another object of this invention is to provide a method of pearl polymerization of vinyl compounds wherein a new and improved suspension stabilizer is used.

An additional object of this invention is to provide a method of pearl polymerization of vinyl compounds wherein a suspension stabilizer can be used in an amount as low as 0.1% by weight based on the monomer.

Other and additional objects will become apparent hereinafter.

The objects of this invention are accomplished, in general, by polymerizing a monomeric vinyl compound in aqueous suspension in the presence of finely divided tricalcium phosphate, the monomer and the tricalcium phosphate being maintained in suspension in the water during the polymerization reaction by agitation and without the addition of any emulsifying agent.

2

The details and manner of practicing the invention will become apparent by reference to the following specific examples, it being understood that these examples are merely illustrative embodiments of the invention and that the scope of the invention is not limited thereto. Throughout the examples, the proportions of the ingredients are by weight.

Example I 300 cc. of water were added to a 500 cc. round bottom flask equipped with thermometer, mechanical stirrer and condenser. 33 mg. of tricalcium phosphate were added to the water in the flask, and the flask was placed in an oil bath which was held at 85° C. 0.3 g. of benzoyl peroxide was dissolved in 30 g. of purified styrene, and the resultant solution of benzoyl peroxide in styrene was poured into the aqueous suspension in the flask, after which stirring was begun and continued throughout the polymerization reaction which was permitted to continue for approximately 5 hours, at the end of which period hard pearls of the polymerized product were obtained. The hard pearls which were isolated by filtering the contents of the flask through a sieve were washed with dilute acid to dissolve the adhering particles of tricalcium phosphate, and thereafter the pearls were dried at 60° C. The pearls had an average diameter of 3 to 4 mm.

It is to be noted that the quantity of tricalcium phosphate employed in the reaction was 0.01% on the system and 0.1% on the styrene.

Example II 300 cc. of water were added to a round bottom flask of the type described in Example I. 66 mg. of tricalcium phosphate were added to the water. A solution, separately prepared and consisting of 0.15 g. benzoyl peroxide dissolved in 30 g. of vinyl acetate free from inhibitor, was added to the aqueous suspension in the flask, and agitation of the contents of the flask begun. While being stirred, the contents of the flask was heated to 70° C. The polymerization reaction was permitted to continue at such temperature for approximately 4 to approximately 5 hours. At the end of this period, hard pearls having an average size of 2 to 3 mm. were obtained. The pearls were separated from the reaction mass by filtration through a sieve, and thereafter treated to remove adhering particles of tricalcium phosphate and dried, as described in Example I.

In order to inhibit substantial hydrolysis, the pH of the reaction mass during the reaction was adjusted to 6 by the addition of a buffer salt.

It is to be noted that the tricalcium phosphate constituted 0.02% on the system and 0.2% on the vinyl acetate.

Example III 50 mgs. of tricalcium phosphate were added to 300 cc. of water in a flask of the type described in Example I. A solution, consisting of 30 g. of distilled methyl methacrylate and 0.3 g. benzoyl peroxide, was poured into the reaction vessel and the contents heated to 80° C. with stirring. The temperature was maintained at 80° C. and the stirring continued for a period of about 5 to about 6 hours, at the end of which time hard pearls having an average size of 3 to 4 mm. were obtained. The pearls were separated from the reaction mass by filtration through an appropriately sized sieve, and thereafter treated to remove adhering particles of tricalcium phosphate and finally dried, as set forth in Example I.

It is to be noted that in this example the tricalcium phosphate was 0.015% on the system and 0.15% on the methyl methacrylate.

In the preferred method of carrying out the process, the finely divided tricalcium phosphate is added to the water and thereafter the solution of the catalyst in the monomer is poured directly into the aqueous suspension. Stirring of the contents is begun immediately after the introduction of the monomer, whereby the monomer and tricalcium phosphate are both dispersed and suspended in the water. The stirring is continued throughout the polymerization reaction to maintain the monomer and tricalcium phosphate in the suspension. Heating can be started after all the ingredients have been introduced or at any stage prior to the introduction of any ingredient in the water. Thus, for example, the water can be heated prior to the addition of the tricalcium phosphate or, alternatively, the suspension of the water and the tricalcium phosphate can be heated prior to the introduction of the monomer.

The temperature at which the reaction is carried out is controlled by means of a thermo regulator. In general, the temperature of the reaction can be varied, but a temperature range of from 60° C. to 90° C. is preferred.

The polymerization reaction is preferably carried out at atmospheric pressure. However, it can be carried out at either higher or lower (than atmospheric) pressure, in which case the temperature would have to be adjusted accordingly.

The ratio of water to monomer can be varied up to as high as 1:1 and as low as desired. In the preferred embodiment of the invention, the monomer-water ratio is 1:10. With such a monomer-water ratio, better temperature control can be had and all of the monomer can be introduced in one charge without agglomeration.

As shown by Example I, the suspending agent, i. e. tricalcium phosphate, can be used in a quantity as low as 0.1% of the monomer. In practice the smallest possible quantity of tricalcium phosphate based on the monomer and the system is preferred in order to facilitate the purification of the finished polymers, but somewhat larger quantities can be used if desired. In general, the higher the concentration of the tricalcium phosphate, the smaller the pearls.

The invention is not restricted to any precise quantity and type of catalyst. Any of the known polymerization catalysts for the respective monomers can be used. Preferably, as shown by the examples, a catalyst which is soluble in the monomer is used.

The time of the polymerization reaction is not limited to any precise period. Normally, the polymerization reaction is permitted to continue until pearls of substantial hardness are obtained.

The invention is not restricted to the specific monomeric vinyl compounds set forth in Examples I and II. In general, the invention can be applied to any monomeric vinyl compound. Illustrative monomeric vinyl compounds which can be used are (1) Styrene and its derivatives, such as dichlorostyrene;

(2) Acrylic acid derivatives, such as methyl acrylate, ethyl acrylate, etc.;

(3) Vinyl acetate.

The above-mentioned ethanoid compounds contain the group $CH_2=CH-$. However, the invention is not restricted thereto since, as shown by Example III, the H attached to the second C atom in the ethanoid group can be substituted by an alkyl group, such as $CH_3$. In other words, the invention is applicable to compounds which contain one $CH_2=CR-$ unit, in which R can be H or a methyl radical. Illustrative examples of compounds containing the group $CH_2=CR-$, wherein R is a methyl radical, are the methacrylic acid derivatives, such as methyl methacrylate and ethyl methacrylate.

Additionally, the invention is applicable to the copolymerization of a plurality of the above-mentioned compounds, such as, for example, the following:

Copolymers of vinyl chloride and vinyl acetate obtained by copolymerization of at least 85% vinyl chloride and 15% vinyl acetate, and preferably 95% vinyl chloride and 5% vinyl acetate.

The instant invention provides a method of pearl polymerization wherein tricalcium phosphate is used in amounts as low as 0.1% by weight based on the monomer and as low as 0.01% by weight of the system. The use of such small quantities is peculiar to tricalcium phosphate since experiments have shown that the known solid inorganic suspension stabilizers, such as alumina, kaolin, talc, barium sulfate, aluminum hydroxide, cannot be used in such small quantities. The use of small quantities of tricalcium phosphate reduces to a minimum the amount thereof which may be entrapped in the pearls, with the result that the pearls produced by the present method are more transparent and have better electrical properties than those of the prior art.

Since it is obvious that many changes and modifications can be made in the above-described details without departing from the nature and spirit of the invention, it is to be understood that the invention is not to be limited thereto except as set forth in the appended claims.

I claim:

1. In the pearl polymerization method of polymerizing styrene, the step which comprises polymerizing the styrene in aqueous suspension and in the presence of from 0.1% to 0.2% by weight of the styrene, of suspended finely divided particles of tricalcium phosphate.

2. In the pearl polymerization method of monomeric vinyl acetate, the step which comprises polymerizing the monomeric vinyl acetate in aqueous suspension and in the presence of from 0.1% to 0.2%, by weight of the monomeric vinyl acetate, of suspended finely divided particles of tricalcium phosphate.

3. In the pearl polymerization method of monomeric methyl methacrylate, the step which comprises polymerizing the monomeric methyl methacrylate in aqueous suspension and in the presence of from 0.1% to 0.2%, by weight of the monomeric methyl methacrylate, of suspended finely divided particles of tricalcium phosphate.

4. In the pearl polymerization method of monomeric ethanoid compounds containing one $CH_2=CR-$ unit, wherein R is a member of the class consisting of H and $CH_3$, the step which comprises polymerizing said monomeric compound in aqueous suspension and in the presence of from 0.1% to 0.2% by weight of said monomeric compound, of suspended finely divided particles of tricalcium phosphate.

5. In the pearl polymerization method of monomeric ethanoid compounds containing one $CH_2=CR-$ unit, wherein R is a member of the class consisting of H and $CH_3$, the step which comprises copolymerizing a pair of said monomeric compounds in aqueous suspension and in the presence of from 0.1% to 0.2%, by weight of said monomeric vinyl compounds, of suspended finely divided particles of tricalcium phosphate.

WALTER P. HOHENSTEIN.

REFERENCES CITED

The following references are of record in the file of this patent:

UNITED STATES PATENTS

| Number | Name | Date |
|---|---|---|
| 2,171,765 | Rohm et al. | Sept. 5, 1939 |
| 2,440,808 | Neher et al. | May 4, 1948 |